US009215083B2

(12) United States Patent
Johnsen et al.

(10) Patent No.: US 9,215,083 B2
(45) Date of Patent: *Dec. 15, 2015

(54) SYSTEM AND METHOD FOR SUPPORTING DIRECT PACKET FORWARDING IN A MIDDLEWARE MACHINE ENVIRONMENT

(75) Inventors: Bjørn Dag Johnsen, Oslo (NO); Martin Paul Mayhead, Hindhead (GB); Ola Tørudbakken, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,368

(22) Filed: Jul. 11, 2012

(65) Prior Publication Data
US 2013/0016731 A1    Jan. 17, 2013

Related U.S. Application Data

(60) Provisional application No. 61/506,557, filed on Jul. 11, 2011.

(51) Int. Cl.
*H04L 12/18* (2006.01)
*H04L 29/08* (2006.01)
(Continued)

(52) U.S. Cl.
CPC ........ *H04L 12/1863* (2013.01); *H04L 12/6402* (2013.01); *H04L 67/2814* (2013.01); *H04L 12/1836* (2013.01); *H04L 12/5696* (2013.01); *H04L 12/64* (2013.01); *H04L 49/10* (2013.01)

(58) Field of Classification Search
CPC . H04L 12/64; H04L 12/6402; H04L 12/5696; H04L 49/10; H04L 12/1863; H04L 67/2814; H04L 12/1836
See application file for complete search history.

(56) References Cited

U.S. PATENT DOCUMENTS 5,758,083 A    5/1998    Singh
6,038,233 A    3/2000    Hamamoto
(Continued)

FOREIGN PATENT DOCUMENTS

CN        1514625        7/2004
CN    101123498 A        2/2008
(Continued)

OTHER PUBLICATIONS

Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.
(Continued)

*Primary Examiner* — Ajay Cattungal
(74) *Attorney, Agent, or Firm* — Tucker Ellis LLP

(57) ABSTRACT

A system and method can support packet direct forwarding in a middleware machine environment. The middleware machine environment comprises one or more external ports on at least one network switch instance, wherein each external port can receive one or more data packets from an external network. Furthermore, the middleware machine environment comprises a plurality of host channel adapter (HCA) ports on one or more host servers, wherein each said HCA port is associated with a said host server, and each said host server can support one or more virtual machines that operate to process the one or more data packets. The at least one network switch operate to send a packet received at an external port to a designated HCA port associated with the external port. An external switch in the external network can send the data packet to the particular external port based on a packet distribution algorithm.

20 Claims, 5 Drawing Sheets

(51) Int. Cl.
  *H04L 12/54* (2013.01)
  *H04L 12/64* (2006.01)
  *H04L 12/933* (2013.01)

(56) References Cited

U.S. PATENT DOCUMENTS

| | | | |
|---|---|---|---|
| 6,098,098 | A | 8/2000 | Sandahl |
| 6,148,336 | A | 11/2000 | Thomas |
| 6,282,678 | B1 | 8/2001 | Snay |
| 6,308,148 | B1 | 10/2001 | Bruins |
| 6,314,531 | B1 | 11/2001 | Kram |
| 6,343,320 | B1 | 1/2002 | Fairchild |
| 6,658,016 | B1 | 12/2003 | Dai |
| 6,658,579 | B1 | 12/2003 | Bell |
| 6,697,360 | B1 | 2/2004 | Gai |
| 6,826,694 | B1 | 11/2004 | Dutta |
| 6,941,350 | B1 | 9/2005 | Frazier |
| 6,981,025 | B1 | 12/2005 | Frazier et al. |
| 7,023,795 | B1 | 4/2006 | Hwu |
| 7,113,995 | B1 | 9/2006 | Beukema et al. |
| 7,290,277 | B1 | 10/2007 | Chou et al. |
| 7,398,394 | B1 | 7/2008 | Johnsen |
| 7,409,432 | B1 | 8/2008 | Recio |
| 7,636,772 | B1 | 12/2009 | Kirby |
| 7,721,324 | B1 | 5/2010 | Jackson |
| 7,843,906 | B1 | 11/2010 | Chidambaram |
| 7,860,006 | B1 | 12/2010 | Kashyap |
| 7,894,440 | B2 | 2/2011 | Xu |
| 8,391,289 | B1 | 3/2013 | Yalagandula |
| 8,645,524 | B2 * | 2/2014 | Pearson ............ H04L 29/12264 370/389 |
| 2002/0016858 | A1 | 2/2002 | Sawada |
| 2002/0133620 | A1 | 9/2002 | Krause |
| 2003/0005039 | A1 * | 1/2003 | Craddock ............ G06F 9/4416 709/203 |
| 2004/0013088 | A1 * | 1/2004 | Gregg ................ H04L 12/5602 370/235 |
| 2004/0028047 | A1 | 2/2004 | Hou |
| 2004/0037279 | A1 | 2/2004 | Zelig et al. |
| 2004/0078709 | A1 * | 4/2004 | Beukema ............ G06F 11/2733 714/43 |
| 2004/0123142 | A1 | 6/2004 | Dubal et al. |
| 2004/0168089 | A1 | 8/2004 | Lee |
| 2004/0199764 | A1 | 10/2004 | Koechling |
| 2005/0071709 | A1 | 3/2005 | Rosenstock |
| 2005/0100033 | A1 * | 5/2005 | Arndt ................ H04L 67/1097 370/412 |
| 2006/0230219 | A1 * | 10/2006 | Njoku ................ G06F 13/4022 710/316 |
| 2006/0248200 | A1 | 11/2006 | Stanev |
| 2007/0022479 | A1 | 1/2007 | Sikdar et al. |
| 2007/0036178 | A1 | 2/2007 | Hares |
| 2007/0038703 | A1 | 2/2007 | Tendjoukian |
| 2007/0073882 | A1 * | 3/2007 | Brown ................ H04L 29/1232 709/226 |
| 2007/0140266 | A1 * | 6/2007 | Njoku ................ G06F 13/4022 370/399 |
| 2007/0280104 | A1 * | 12/2007 | Miyoshi ................ H04L 45/00 370/229 |
| 2008/0137528 | A1 | 6/2008 | O'Toole |
| 2008/0159277 | A1 | 7/2008 | Vobbilisetty |
| 2008/0163124 | A1 | 7/2008 | Bonev |
| 2008/0267183 | A1 * | 10/2008 | Arndt ................ H04L 12/18 370/390 |
| 2008/0301256 | A1 | 12/2008 | McWilliams |
| 2009/0003317 | A1 | 1/2009 | Kasralikar |
| 2009/0019505 | A1 | 1/2009 | Gopalakrishnan |
| 2009/0070448 | A1 * | 3/2009 | Pearson ............ H04L 29/12264 709/223 |
| 2009/0073895 | A1 | 3/2009 | Morgan |
| 2009/0080328 | A1 * | 3/2009 | Hu ................ H04L 65/4084 370/230 |
| 2009/0222558 | A1 | 9/2009 | Xu et al. |
| 2009/0234974 | A1 * | 9/2009 | Arndt ................ H04L 12/2602 709/250 |
| 2009/0262741 | A1 | 10/2009 | Jungck |
| 2010/0008291 | A1 | 1/2010 | LeBlanc |
| 2010/0054129 | A1 * | 3/2010 | Kuik ................ H04L 47/10 370/235 |
| 2010/0103837 | A1 | 4/2010 | Jungck |
| 2010/0107162 | A1 | 4/2010 | Edwards |
| 2010/0118868 | A1 | 5/2010 | Dabagh |
| 2010/0138532 | A1 | 6/2010 | Glaeser |
| 2010/0257269 | A1 | 10/2010 | Clark |
| 2010/0275199 | A1 | 10/2010 | Smith et al. |
| 2010/0287548 | A1 | 11/2010 | Zhou et al. |
| 2010/0306408 | A1 | 12/2010 | Greenberg |
| 2010/0325257 | A1 | 12/2010 | Goel |
| 2011/0023108 | A1 | 1/2011 | Geldermann et al. |
| 2011/0131447 | A1 | 6/2011 | Prakash et al. |
| 2011/0239268 | A1 | 9/2011 | Sharp |
| 2011/0246669 | A1 | 10/2011 | Kanada et al. |
| 2011/0268117 | A1 | 11/2011 | Davis |
| 2011/0299537 | A1 | 12/2011 | Saraiya et al. |
| 2012/0103837 | A1 | 5/2012 | Wall |
| 2012/0131225 | A1 | 5/2012 | Chiueh et al. |
| 2012/0147894 | A1 | 6/2012 | Mulligan |
| 2012/0173757 | A1 | 7/2012 | Sanden |
| 2012/0265976 | A1 | 10/2012 | Spiers |
| 2012/0278804 | A1 | 11/2012 | Narayanasamy |
| 2012/0291028 | A1 * | 11/2012 | Kidambi ............... H04L 49/602 718/1 |
| 2012/0307826 | A1 | 12/2012 | Matsuoka |
| 2012/0314706 | A1 * | 12/2012 | Liss ................ H04L 49/602 370/392 |
| 2012/0320929 | A9 | 12/2012 | Subramanian |
| 2012/0331127 | A1 | 12/2012 | Wang |
| 2012/0331142 | A1 | 12/2012 | Mittal et al. |
| 2013/0016718 | A1 | 1/2013 | Johnsen |
| 2013/0036136 | A1 | 2/2013 | Horii |
| 2013/0077492 | A1 * | 3/2013 | Scaglione ........... H04L 41/0816 370/235 |
| 2013/0232492 | A1 | 9/2013 | Wang |
| 2014/0115584 | A1 | 4/2014 | Mudigonda |
| 2014/0223431 | A1 | 8/2014 | Yoshimura |

FOREIGN PATENT DOCUMENTS

| | | |
|---|---|---|
| EP | 1 128 607 A2 | 8/2001 |
| EP | 2160068 A1 | 3/2010 |
| WO | 2012037518 | 3/2012 |

OTHER PUBLICATIONS

Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.

International Search Report dated Sep. 26, 2013 for Application No. PCT/US2013/040656, 10 pages.

European Patent Office International Searching Authority, International Search Report and Written Opinion for PCT International Application No. PCT/US2012/046225, Oct. 11, 2012, 10 pages.

European Patent Office International Searching Authority, International Search Report and Written Opinion for PCT International Application No. PCT/US2012/046219, Mar. 1, 2013, 17 pages.

State Intellectual Property Office of the People's Republic of China, Search Report for Chinese Patent Application No. 201280030334.2, Office Action dated Aug. 21, 2015, 2 pages.

State Intellectual Property Office of the People's Republic of China, Search Report for Chinese Patent Application No. 201280027279.1, Office Action dated Sep. 9, 2015, 2 pages.

* cited by examiner

SYSTEM AND METHOD FOR SUPPORTING DIRECT PACKET FORWARDING IN A MIDDLEWARE MACHINE ENVIRONMENT

CLAIM OF PRIORITY

This application claims priority to U.S. Provisional Patent Application No. 61/506,557, entitled "SYSTEM AND METHOD FOR USING UNICAST AND MULTICAST FLOODING MECHANISMS TO PROVIDE EoIB GATEWAY vNICs" filed Jul. 11, 2011, which application is herein incorporated by reference.

CROSS REFERENCE TO RELATED APPLICATIONS

The application is related to the following patent applications, which are hereby incorporated by reference in its entirety:

U.S. patent application Ser. No. 13/546,217, entitled "SYSTEM AND METHOD FOR USING A MULTICAST GROUP TO SUPPORT A FLOODING MECHANISM IN A MIDDLEWARE MACHINE ENVIRONMENT", filed Jul. 11, 2012, which is now U.S. Pat. No. 9,054,886, issued on Jun. 9, 2015.

U.S. patent application Ser. No. 13/546,236, entitled "SYSTEM AND METHOD FOR USING A PACKET PROCESS PROXY TO SUPPORT A FLOODING MECHANISM IN A MIDDLEWARE MACHINE ENVIRONMENT", filed Jul. 11, 2012, U.S. patent application Ser. No. 13/546,261, entitled "SYSTEM AND METHOD FOR SUPPORTING A SCALABLE FLOODING MECHANISM IN A MIDDLEWARE MACHINE ENVIRONMENT", filed Jul. 11, 2012, and U.S. patent application Ser. No. 13/546,405, entitled "SYSTEM AND METHOD FOR SUPPORTING A VIRTUAL MACHINE MIGRATION IN A MIDDLEWARE MACHINE ENVIRONMENT", filed Jul. 11, 2012, which is now U.S. Pat. No. 8,874,742, issued on Oct. 28, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in super-computers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein are systems and methods for supporting packet direct forwarding in a middleware machine environment. The middleware machine environment comprises one or more external ports on at least one network switch instance, wherein each external port can receive one or more data packets from an external network. Furthermore, the middleware machine environment comprises a plurality of host channel adapter (HCA) ports on one or more host servers, wherein each said HCA port is associated with a said host server, and each said host server can support one or more virtual machines that operate to process the one or more data packets. The at least one network switch operate to send a packet received at an external port to a designated HCA port associated with the external port. An external switch in the external network can send the data packet to the particular external port based on a packet distribution algorithm.

DETAILED DESCRIPTION

Described herein is a system and method for providing a middleware machine or similar platform. In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Middleware Machine Environment

Figure 1:
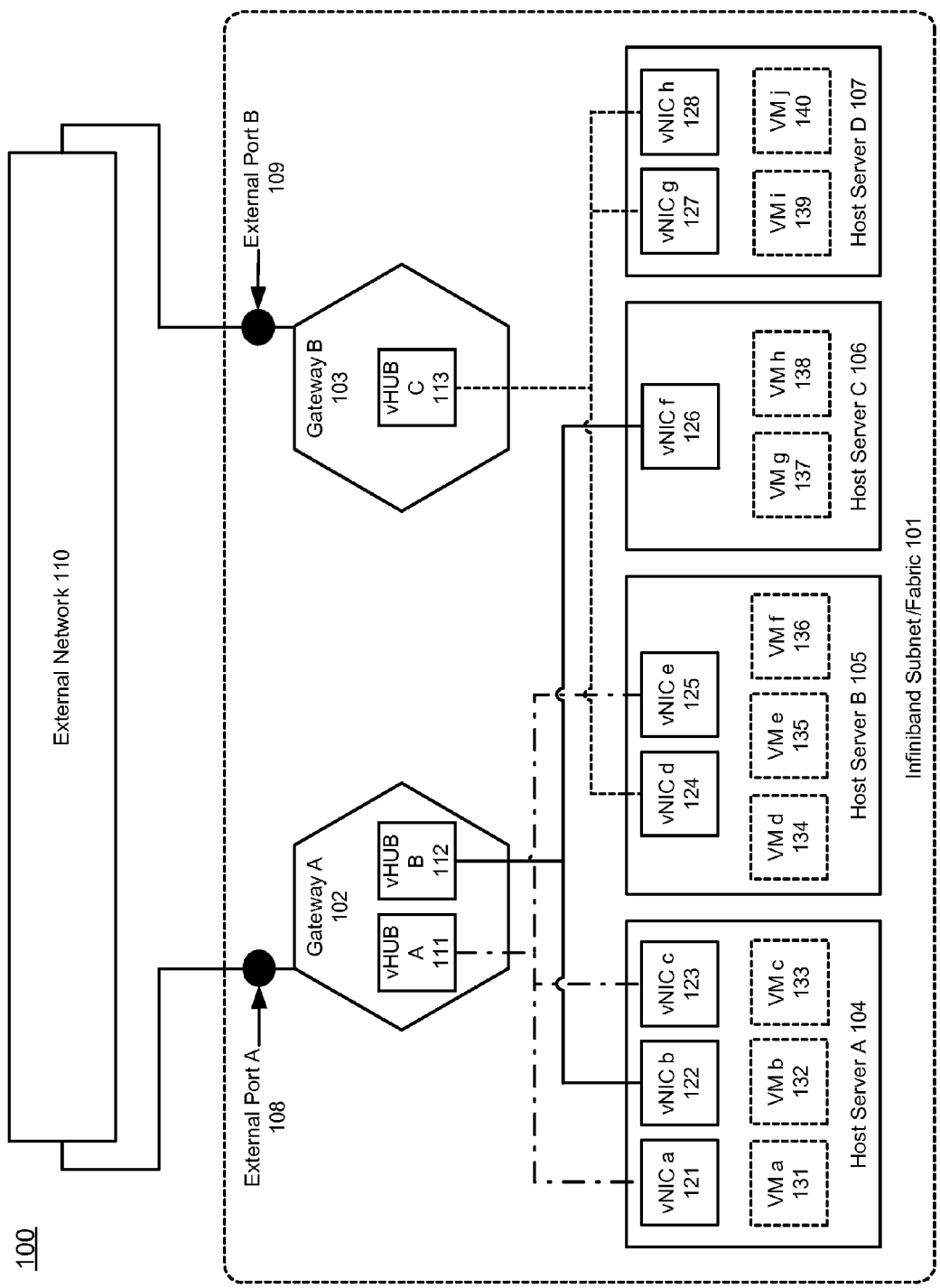
FIG. 1 shows an illustration of a middleware machine environment, in accordance with an embodiment of the invention.

FIG. 1 shows an illustration of a middleware machine environment, in accordance with an embodiment of the invention. As shown in FIG. 1, a middleware machine environment 100 can include an IB fabric 101 that connects to an external network 110 using one or more gateway instances 102-103. The IB fabric also includes a plurality of host servers 104-107 (each of which can be hardware itself or software running on top of a physical host server), which contains a plurality of virtual machines (VMs) 131-140. Each gateway instance A-B 102-103 can be associated with an external port 108-109 that can receive data packets from the external network 110. As shown in FIG. 1, external port A 108 is associated with gateway instance A 102, and external port B 109 is associated with gateway instance B 103.

Additionally, the host servers provides a plurality of virtual interfaces, such as virtual network interface cards (vNICs) 121-128, for receiving data packets from the external network via the gateway instances A-B 102-103. The gateway instances 102-103 can define and maintain one or more virtual hubs (vHUBs) 111-113, each of which defines a logical layer 2 (L2) link on the IB fabric side that contains vNICs associated with the same gateway instance. Furthermore, the vNICs and the hosts that belong to the same vHUB can communicate with each other without involving the associated gateway instance.

As shown in FIG. 1, vHUB A 111 on gateway A is associated with vNIC a 121 and vNIC c 123 on host server A, and vNIC e 125 on host server B. Also, vHUB B 112 on gateway A is associated with vNIC b 122 on host server A and vNIC f 126 on host server C; and vHUB C 113 on gateway B is associate with vNIC d 124 on host server B, and vNIC g 127 and vNIC h 128 on host server D.

Figure 2:
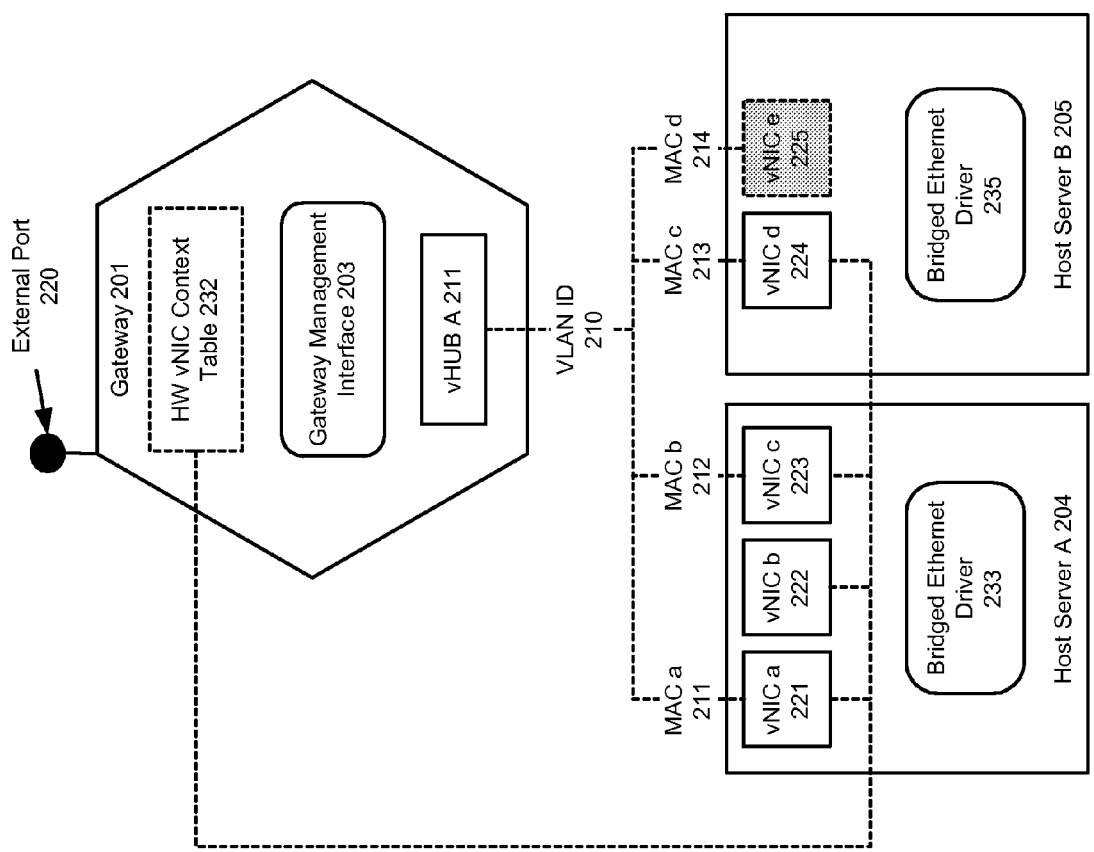
FIG. 2 shows an illustration of a virtual hub (vHUB) that includes various vNICs associated with different types of context, in accordance with an embodiment of the invention.

FIG. 2 shows an illustration of a virtual hub (vHUB) that includes various vNICs, in accordance with an embodiment of the invention. As shown in FIG. 2, a middleware machine environment 200 includes a gateway instance 201 and several host servers 204-205 or hypervisors. The gateway instance 201, which comprises an external port 220, can maintain a virtual hub (vHUB), vHUB A 211. The vHUB A 211 can be assigned with a unique virtual LAN ID (VLAN ID) 210. Additionally, the vHUB A 211 can include various vNICs 221, 223-225, each of which is assigned with a Media Access Control (MAC) address 211-214. Each logical vNIC 221, 223-225 can be represented by a MAC/VLAN ID combination associated with a specific Host Channel Adaptor (HCA) port.

A vNIC in the IB fabric can be uniquely identified using a virtual Ethernet interface (VIF), which includes a combination of a VLAN ID and a MAC address. Also, when the VIFs are used concurrently in the same vHub in a gateway instance, different MAC addresses are used for the different VIFs. Additionally, the system can perform an address translation from an Ethernet layer 2 MAC address to an IB layer 2 address that uses local identifier (LID)/global identifier (GID) and queue pair number (QPN).

Furthermore, the gateway instance 201 can include a hardware vNIC context table 232, which contains various entries or hardware vNIC contexts. The hardware vNIC context table 232 can be stored in a memory of the gateway instance 201. When a host driver is sending packets to the external Ethernet via the IB fabric and the gateway 201, this hardware vNIC context table 232 can be used to verify that the correct source address information is used by the correct host. The hardware context table 232 can also be used to look up the correct host HCA port address on the IB fabric and QPN within that HCA, when packets are received by the gateway from the external Ethernet. Additionally, the hardware vNIC contexts can be used to directly steer packets for a specific logical vNIC to a dedicated receive queue in the designated host context/memory.

The gateway instance 201, which can be hardware itself or a software running on top of a hardware switch, allows the use of network managed vNIC allocation. The management interface 203 on the gateway instance 201, e.g. a NM2-GW service processor, can be used to allocate hardware vNIC contexts on behalf of specific host (HCA) ports.

A single vNIC in the IB fabric may or may not be allocated with a hardware vNIC context recorded in the hardware vNIC context table 232. In the example as shown in FIG. 2, vNIC a 221, vNIC b 222, and vNIC c 223 on host server A 204, and vNIC d 224 on host server B 205, can be provided with a hardware vNIC context (i.e. the gateway instance 201 can obtain the correct host HCA port address on the IB fabric and QPN within that HCA for an incoming data packet). Additionally, vNIC e 225 on host server B 205 is not allocated with hardware vNIC context 232 and can only be used in a bridged Ethernet context. In one example, if the complete gateway hardware vNIC contexts in the hardware vNIC context table 232 are consumed by the network managed vNICs, e.g. vNICs a-d 221-224, then all bridge based vNICs, e.g. vNIC e 225, can be flooding based (i.e. not having any dedicated HW vNIC context).

A flooding mechanism can be used to scale the number of logical vNICs beyond the size of the gateway HW vNIC context table. Using the flood-based vNICs, the system allows the same amount of receive queues on the host(s) to receive packets for a large number of logical vNICs. Furthermore, using a flooding mechanism, the system allows schemes where hardware vNIC contexts can be established in the hardware context table 232 after initial packet traffic from the external Ethernet has been received.

Direct Packet Forwarding

Figure 3:
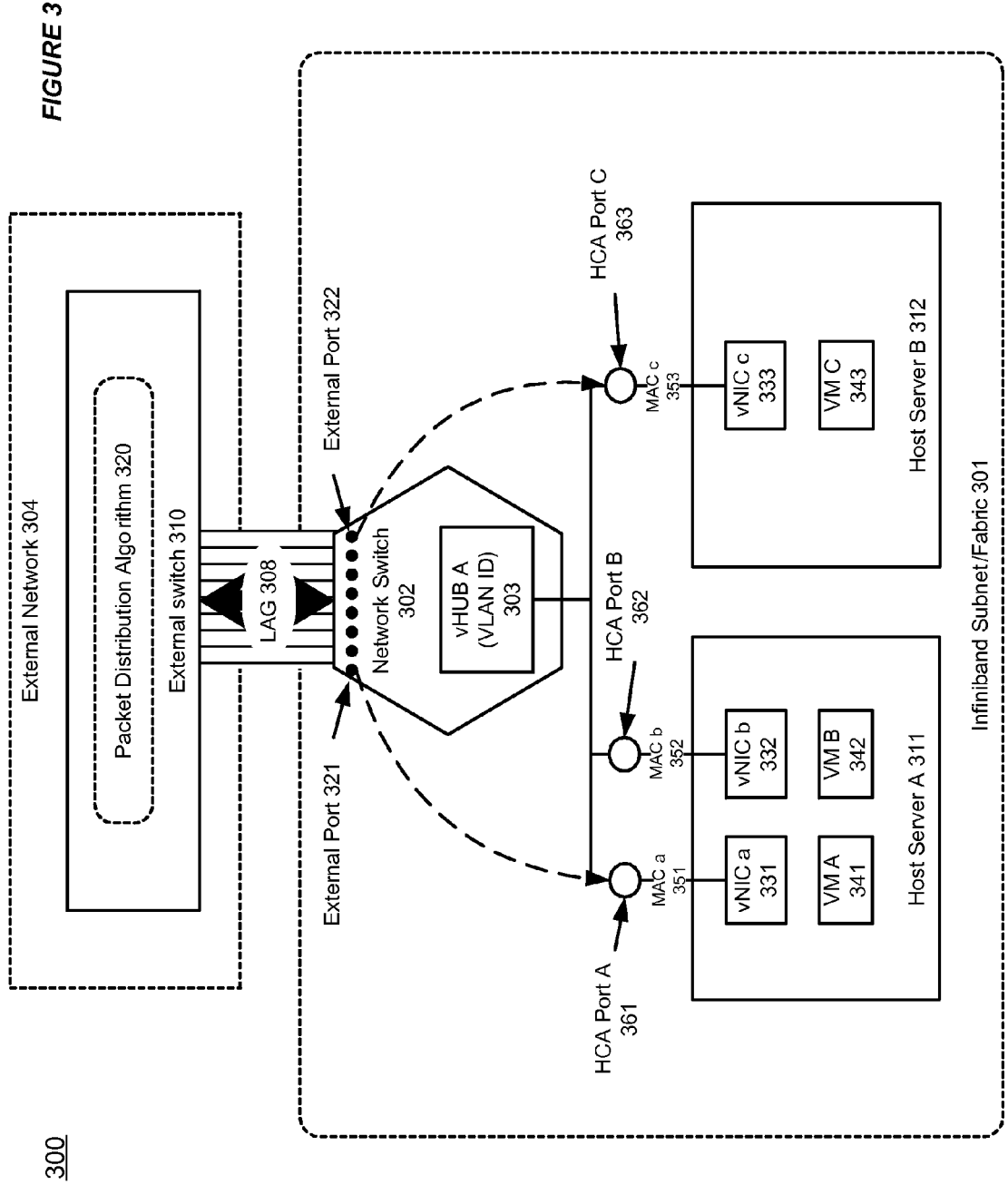
FIG. 3 shows an illustration of a middleware machine environment that supports direct packet forwarding, in accordance with an embodiment of the invention.

FIG. 3 shows an illustration of a middleware machine environment that supports direct packet forwarding, in accordance with an embodiment of the invention. As shown in FIG. 3, an external switch 310 in an external network 304 in a middleware machine environment 300 can communicate with a network switch 302 in an IB fabric 301, e.g. using a link aggregation (LAG) component 308. The LAG component 308 can be used to combine multiple external ports 321-322 into one logical port, the bandwidth of which can be linearly scaled accordingly to the total number of the external ports.

The network switch 302 (or switches) can include the above one or more external ports 321-322, each of which can receive one or more data packets from the external network 304. Furthermore, the IB fabric 301 can include one or more host servers, e.g. host servers A-B 311-312, each of which can support one or more virtual machines for processing the received data packets. For example, host server A 311 supports VM A 341 and VM B 342, and host server B 312 supports VM C 343.

Additionally, the network switch 302 can maintain one or more virtual hubs, e.g. vHUB A 303 (with a unique VLAN ID). The vHUB A 303 can include various vNICs a-c 331-333, each of which is assigned with a MAC address a-c 351-353. Here, each MAC/VLAN ID combination represents a logical vNIC a-c 331-333 associated with a specific HCA port, e.g. HCA port A-C 361-363.

Furthermore, the external switch 310 in the external network 304 can direct a data packet to a particular external port based on a packet distribution algorithm 320. Then, the network switch 302 can send packets received at different external ports to different designated HCA ports. As shown in FIG. 3, the network switch 302 can send a packet received at an external port 321 to a designated HCA port A 361, and the network switch 302 can send a packet received at an external port 322 to a designated HCA port C 363.

In accordance with an embodiment of the invention, the external network 304, which communicate with the IB fabric 301, can be an Ethernet network, such as a 10G Ethernet network. Additionally, the network switch 302 can forward an incoming data packet, e.g. received at an external port 321, based on an evaluation of virtual machine specific quality of service/service level agreement (QoS/SLA).

Figure 4:
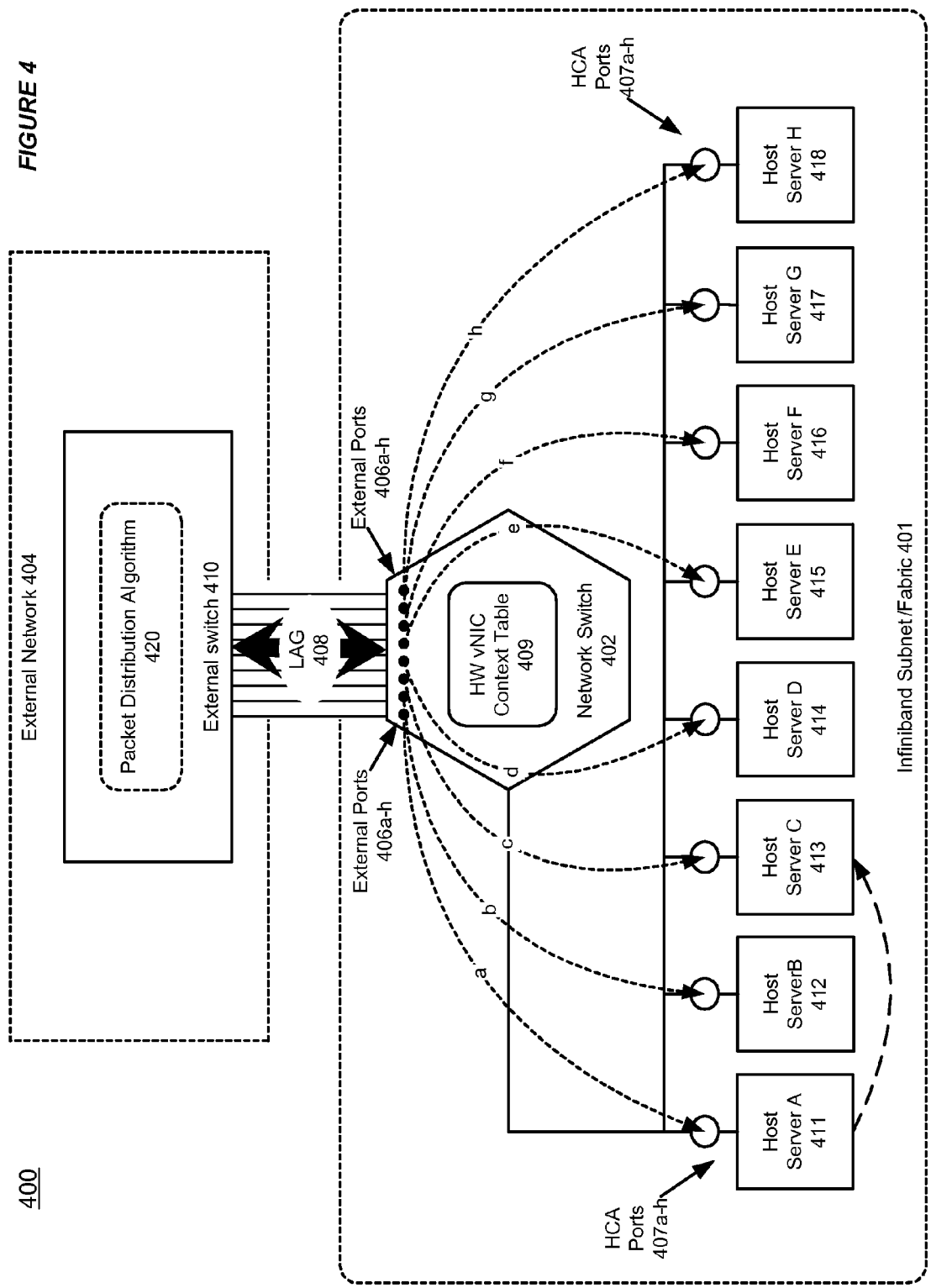
FIG. 4 shows an illustration of a middleware machine environment that supports flexible packet forwarding based on a packet distribution algorithm, in accordance with an embodiment of the invention.

FIG. 4 shows an illustration of a middleware machine environment that supports flexible packet forwarding based on packet distribution algorithm, in accordance with an embodiment of the invention. As shown in FIG. 4, an external switch 410 in an external network 404 in a middleware machine environment 400 can communicate with t network switch 402 in an IB fabric 401, e.g. using a link aggregation (LAG) component 408. Furthermore, the IB fabric 401 can include one or more host servers, e.g. host servers A-H 411-418, with a plurality of host channel adapter (HCA) ports 407a-h.

The network switch 402 (or switches) can include one or more external ports 406a-h, each of which can receive one or more data packets from the external network 404 and be associated with a different designated HCA port 407a-h. Furthermore, the network switch 402 allows the external switch 410 in the external network 404 to send a data packet to a particular external port 406a-h on the network switch 401, e.g. based on a packet distribution algorithm 420. Additionally, the allocation of destination address, such as MAC and IP addresses, for the virtual machines on various servers (e.g. host server A-H 411-418) can correspond to, or be matched with, the packet distribution algorithm 420 of the external switch 410.

Furthermore, an incoming data packet received at a host server, e.g. host server A 411 associated with the designated HCA port 407a for the external port 406a, may be sent to another host server, e.g. host server C 413. Then, the virtual machines on host server C 413 can process the packet.

Additionally, a constant stream of data packets can be sent to each external port 406a-h on the network switch 401. The incoming data packets can be flood based, or more specifically be based on direct forwarding, when there is no hardware context available in the hardware vNIC context table 409. The hardware context table 409, which contains a plurality of hardware context entries, can be used to forward an incoming data packet with hardware context to a target HCA port 407a-h, when it is appropriate. Here, the hardware context entries in the hardware vNIC context table 409 can be used to look up the correct host HCA port address on the IB fabric 401 and QPN within that HCA, when packets are received from the external network 404.

Figure 5:
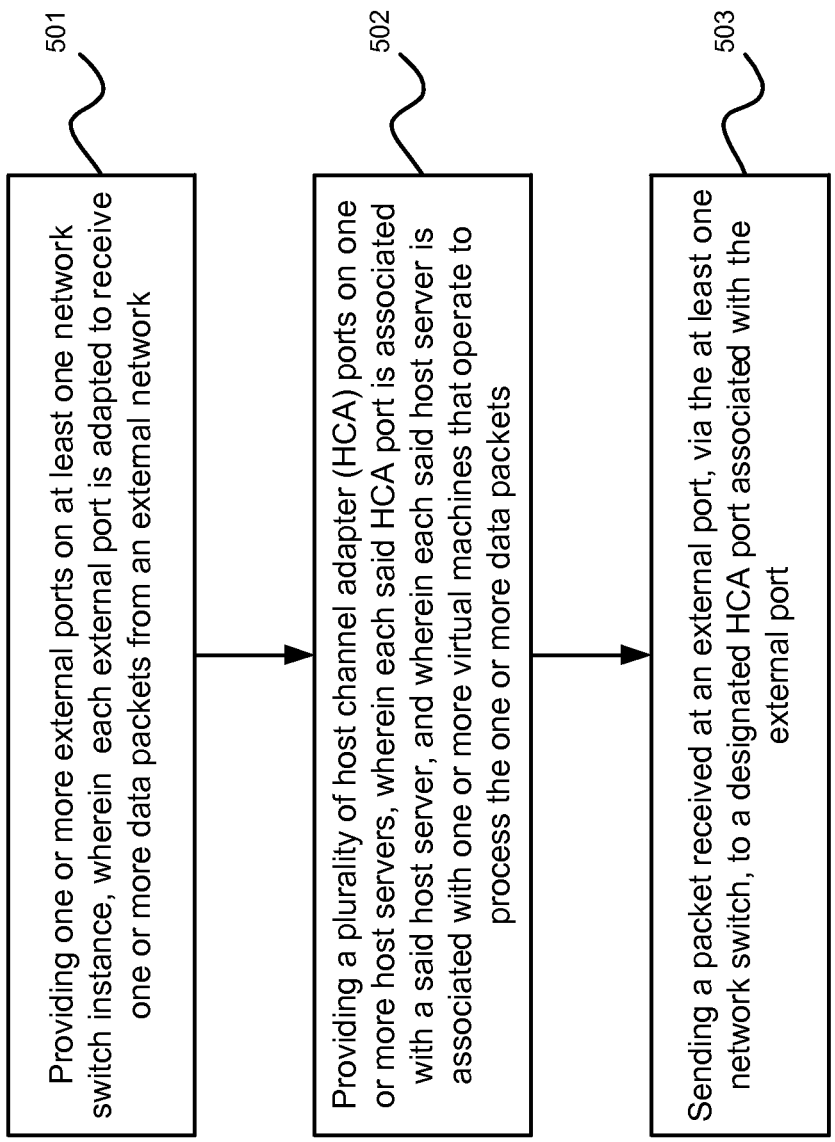
FIG. 5 illustrates an exemplary flow chart for supporting direct packet forwarding in a middleware machine environment, in accordance with an embodiment of the invention.

FIG. 5 illustrates an exemplary flow chart for supporting direct packet forwarding in a middleware machine environment, in accordance with an embodiment of the invention. As shown in FIG. 5, at step 501, one or more external ports can be provided on at least one network switch instance, wherein each external port is adapted to receive one or more data packets from an external network. Then, at step 502, a plurality of host channel adapter (HCA) ports can be provided on one or more host servers, wherein each said HCA port is associated with a said host server, and wherein each said host server is associated with one or more virtual machines that operate to process the one or more data packets. Additionally, at step 503, a network switch can send a packet received at an external port to a designated HCA port associated with the external port.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting packet direct forwarding in a middleware machine environment operating on one or more microprocessors, comprising:
one or more external ports on at least one network switch instance, wherein each external port is adapted to receive one or more data packets from an external network;
a virtual hub (vHUB) maintained on the at least one network switch instance and associated with a plurality of virtual network interface cards (vNICs), wherein the vHUB is assigned a virtual local area network identification (VLAN ID) and the plurality of vNICs are each assigned a media access control (MAC) address;
a plurality of host channel adapter (HCA) ports on a plurality of host servers, wherein each said HCA port is associated with a said host server via a vNIC from the plurality of vNICs, and wherein each said host server is associated with one or more virtual machines that operate to process the one or more data packets; and
wherein the at least one network switch instance operates to send a packet received at an external port to a designated HCA port, wherein the designated HCA port is identified via a combination of the VLAN ID assigned to the vHUB and a MAC address assigned to an associated vNIC;
wherein upon receiving the packet, a host server associated with the designated HCA port is configured to determine whether to forward the packet to a HCA port from the plurality of HCA ports on another host server from the plurality of host servers for processing by a virtual machine on the another host server; and
wherein upon determining to forward the packet to another host server, the host server is configured to communicate directly with the another server via vNICs associated with the respective host servers.

2. The system according to claim 1, wherein:
each said external port is associated with a different designated HCA port.

3. The system according to claim 1, wherein:
the at least one network switch instance allows an external switch in the external network to send a data packet to a particular external port on the network switch instance, wherein the data packet is destined for a particular HCA port that is designated for a particular external port.

4. The system according to claim 3, wherein:
the external switch in the external network operates to send the data packet to the particular external port based on a packet distribution algorithm.

5. The system according to claim 4, wherein:
each said host server can use an address allocation algorithm to allocate an address to a vNIC associated with a virtual machine, wherein the address allocation algorithm corresponds to the packet distribution algorithm of the external switch.

6. The system according to claim 1, wherein:
the external network is an Ethernet network and the at least one network switch instance is InfiniBand based.

7. The system according to claim 1, further comprising:
a link aggregation component that can combine multiple external ports into a logical port, and wherein bandwidth of the logical port is linearly scaled accordingly to a total number of the multiple external ports.

8. The system according to claim 1, wherein:
the host server associated with the designated HCA port operates to forward the packet to a destination virtual machine on either the local host server or the another host server.

9. The system according to claim 1, further comprising:
a hardware context table that contains a plurality of contexts, which can be used to forward an incoming data packet to a HCA port.

10. The system according to claim 1, wherein:
the at least one network switch instance operates to forward an incoming data packet received at an external port based on an evaluation of virtual machine specific QoS/SLA.

11. A method for supporting packet direct forwarding in a middleware machine environment operating on one or more microprocessors, comprising:
providing one or more external ports on at least one network switch instance, wherein each external port is adapted to receive one or more data packets from an external network;
providing a virtual hub (vHUB) maintained on the at least one network switch instance and associated with a plurality of virtual network interface cards (vNICs), wherein the vHUB is assigned a virtual local area network identification (VLAN ID) and the plurality of vNICs are each assigned a media access control (MAC) address;
providing a plurality of host channel adapter (HCA) ports on a plurality of host servers, wherein each said HCA port is associated with a said host server via a vNIC from the plurality of vNICs, and wherein each said host server is associated with one or more virtual machines that operate to process the one or more data packets;
sending a packet received at an external port, via the at least one network switch instance, to a designated HCA port, wherein the designated HCA port is identified via a combination of VLAN ID assigned to the vHUB and a MAC address assigned to an associated vNIC; and
determining upon receiving the packet at a host server associated with the designated HCA port, whether to forward the packet to another host server for processing by a virtual machine on the another host server;
wherein upon determining to forward the packet to another host server, the host server is configured to communicate directly with the another server via vNICs associated with the respective host servers.

12. The method according to claim 11, further comprising:
associating each said external port with a different designated HCA port.

13. The method according to claim 11, further comprising:
allowing an external switch in the external network to send a data packet to a particular external port on the network switch instance,
allowing the data packet to be destined for a particular HCA port that is designated for a particular external port; and
allowing the external switch in the external network to send the data packet to the particular external port based on a packet distribution algorithm.

14. The method according to claim 13, further comprising:
allowing each said host server to use an address allocation algorithm to allocate an address to a vNIC associated with a virtual machine, wherein the address allocation algorithm corresponds to the packet distribution algorithm of the external switch.

15. The method according to claim 11, further comprising:
allowing the external network to be an Ethernet network and the at least one network switch instance to be InfiniBand based.

16. The method according to claim 11, further comprising:
providing a link aggregation component that can combine multiple external ports into a logical port, and wherein bandwidth of the logical port is linearly scaled accordingly to a total number of the multiple external ports.

17. The method according to claim 11, further comprising:
allowing the host server associated with the designated HCA port operates to forward the packet to a destination virtual machine when the destination virtual machine is on either the local host server or the another host server.

18. The method according to claim 11, further comprising:
providing a hardware context table that contains a plurality of contexts, which can be used to forward an incoming data packet to a HCA port.

19. The method tem according to claim 11, further comprising:
allowing the at least one network switch instance to forward an incoming data packet received at an external port based on an evaluation of virtual machine specific QoS/SLA.

20. A non-transitory machine readable storage medium having instructions stored thereon for supporting packet direct forwarding in a middleware machine environment that when executed cause a system to perform the steps comprising:

providing one or more external ports on at least one network switch instance, wherein each external port is adapted to receive one or more data packets from an external network;

providing a virtual hub (vHUB) maintained on the at least one network switch instance and associated with a plurality of virtual network interface cards (vNICs), wherein the vHUB is assigned a virtual local area network identification (VLAN ID) and the plurality of vNICs are each assigned a media access control (MAC) address;

providing a plurality of host channel adapter (HCA) ports on a plurality of host servers, wherein each said HCA port is associated with a said host server via a vNIC from the plurality of vNICs, and wherein each said host server is associated with one or more virtual machines that operate to process the one or more data packets;

sending a packet received at an external port, via the at least one network switch instance, to a designated HCA port, wherein the designated HCA port is identified via a combination of the VLAN ID assigned to the vHUB and a MAC address assigned to an associated vNIC; and determining upon receiving the packet at a host server associated with the designated HCA port, whether to forward the packet to another host server for processing by a virtual machine on the another host server;

wherein upon determining to forward the packet to another host server, the host server is configured to communicate directly with the another server via vNICs associated with the respective host servers.

* * * * *